United States Patent
Chan et al.

(10) Patent No.: US 10,169,557 B2
(45) Date of Patent: Jan. 1, 2019

(54) PICTURE/GESTURE PASSWORD PROTECTION

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Jefferson Hills, PA (US); Deepti Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 14/862,338

(22) Filed: Sep. 23, 2015

(65) Prior Publication Data
US 2017/0083691 A1 Mar. 23, 2017

(51) Int. Cl.
*G06F 21/31* (2013.01)
*G06F 21/36* (2013.01)
(Continued)

(52) U.S. Cl.
CPC ........ *G06F 21/316* (2013.01); *G06F 3/04883* (2013.01); *G06F 21/36* (2013.01);
(Continued)

(58) Field of Classification Search
CPC .... G06F 21/316; G06F 3/04883; G06F 21/36; G06F 21/46; H04L 63/083; H04L 63/20
See application file for complete search history.

(56) References Cited

U.S. PATENT DOCUMENTS

| 6,421,453 B1 * | 7/2002 | Kanevsky ............. G06F 21/316 340/5.2 |
| 8,638,939 B1 | 1/2014 | Casey et al. |

(Continued)

FOREIGN PATENT DOCUMENTS

| WO | 2006081593 | 8/2006 |
| WO | 2012016727 | 2/2012 |

OTHER PUBLICATIONS

Chen Sun, Yang Wang, Jun Zheng "Dissecting pattern unlock: the effect of pattern strength meter on pattern selection", Journal of Information Security and Applications, vol. 19, pp. 308-320, Elsevier, 2014.*

(Continued)

*Primary Examiner* — Catherine B Thiaw
(74) *Attorney, Agent, or Firm* — Tutunjian & Bitetto, P.C.

(57) ABSTRACT

A system and a computer program product are provided for identifying a strength of an input picture password formed by performing a sequence of gestures relative to a picture. The system includes a memory device for storing a crowd-source history of picture passwords formed by tracking a plurality of picture passwords used to authenticate a plurality of users. Each of the plurality of users has a respective user profile. The system further includes a processor-based demography-based pattern usage assessment generator for generating a demography-based pattern usage assessment by analyzing the crowd source history and the user profile of the plurality of users. The system also includes a user-perceptible indication device for providing an indication of the strength of the input picture password in accordance with the demography-based pattern usage assessment.

19 Claims, 9 Drawing Sheets

(51) Int. Cl.
*G06F 21/46* (2013.01)
*H04L 29/06* (2006.01)
*G06F 3/0488* (2013.01)

(52) U.S. Cl.
CPC ............ *G06F 21/46* (2013.01); *H04L 63/083* (2013.01); *H04L 63/20* (2013.01)

(56) References Cited

U.S. PATENT DOCUMENTS

| | | | |
|---|---|---|---|
| 8,875,279 B2 | 10/2014 | Quintanilla | |
| 8,881,251 B1 | 11/2014 | Hilger | |
| 2004/0230843 A1* | 11/2004 | Jansen | .................... G06F 21/36 |
| | | | 726/7 |
| 2010/0186074 A1 | 7/2010 | Stavrou et al. | |
| 2012/0066650 A1 | 3/2012 | Tirpak et al. | |
| 2012/0140042 A1* | 6/2012 | Albertson | ........ G08B 13/19613 |
| | | | 348/46 |
| 2012/0198529 A1* | 8/2012 | Theimer | .................. G06F 21/46 |
| | | | 726/6 |
| 2012/0304284 A1* | 11/2012 | Johnson | ................ H04L 9/3226 |
| | | | 726/19 |
| 2013/0269010 A1* | 10/2013 | Wheeler | .................. G06F 21/46 |
| | | | 726/6 |
| 2014/0181956 A1 | 6/2014 | Ahn et al. | |
| 2014/0310805 A1 | 10/2014 | Kandekar | |
| 2015/0046969 A1 | 2/2015 | Abuelsaad et al. | |
| 2015/0128233 A1 | 5/2015 | Nechytaylo et al. | |
| 2015/0135289 A1* | 5/2015 | Hosabettu | ............... G06F 21/46 |
| | | | 726/6 |
| 2015/0178490 A1* | 6/2015 | Tamboly | ................. G06F 21/46 |
| | | | 726/4 |

OTHER PUBLICATIONS

Andrew C Gallagher, Tsuhan Chen "Estimating age, gender, and identity using first name priors", IEEE, 2008, 8 pages.*
Sreeramareddy, et al., Investigating Gesture-based Password: Usability and Vulnerability to Shoulder-surfing Attacks, 2014 Conference on Research in Adaptive and Convergent Systems, RACS, Oct. 2014, 6 Pages.
Van Den Bergh, et al., "Real-time 3D Hand Gesture Interaction with a Robot for Understanding Directions from Humans", 20th IEEE International Symposium on Robot and Human Interactive Communication, Aug. 2011, 6 Pages.
Sinofsky, S., "Signing in with a Picture Password", Building Windows 8—Site Home—MSDN—Dec. 2011, pp. 1-23.
Zhao, et al., "On the Security of Picture Gesture Authentication", 22nd USENIX Security Symposium, Aug. 2013, pp. 1-3.
Windows, "Personalize Your PC", Windows Tutorial, 2015, pp. 1-3. http://windows.microsoft.com/en-us/windows-8/personalize-pc-tutorial.
Google, "Picture Password Lockscreen", Andriod Apps on Google Play, 2015, pp. 1-3. https://play.google.com/store/apps/details?id=com.TwinBlade.PicturePassword.
Smith, "Privacy and Security Fanatic", Network World, Sep. 2013, 4 pages.

* cited by examiner

US 10,169,557 B2

PICTURE/GESTURE PASSWORD PROTECTION

BACKGROUND

Technical Field

The present invention relates generally to security and, in particular, to picture/gesture password protection.

Description of the Related Art

Picture password, also referred to herein as picture/gesture password, is a process by which users can sign in to their device using a picture and performing touch gestures on the picture (via, e.g., a touchscreen or mouse). Picture password is becoming more popular as a login process due to the prevalence of mobile devices and touch screens. The companies using these picture password technologies claim that gestures are faster and simpler to remember than long alphanumeric passwords. However, these actions/gestures have some vulnerabilities.

People tend to use similar patterns while doing gestures during this process (left to right movements with lines or top/right/bottom/left/top movements with circles as examples). Hackers/attackers can "look over the shoulder" (by proximity, with cameras, and so forth) to copy picture password patterns easily. Pictures could be too simple (not enough contrast) such that picture passwords may not be suitable for a secure process. For example, some photos do not have many points of interests and will cause the user to only have few options for touch patterns.

Thus, there is a need for improved picture/gesture password protection.

SUMMARY

According to an aspect of the present principles, a system is provided for identifying a strength of an input picture password formed by performing a sequence of gestures relative to a picture. The system includes a memory device for storing a crowdsource history of picture passwords formed by tracking a plurality of picture passwords used to authenticate a plurality of users. Each of the plurality of users has a respective user profile. The system further includes a processor-based demography-based pattern usage assessment generator for generating a demography-based pattern usage assessment by analyzing the crowd source history and the user profile of the plurality of users. The system also includes a user-perceptible indication device for providing an indication of the strength of the input picture password in accordance with the demography-based pattern usage assessment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to picture/gesture password protection. It is to be appreciated that the phrases "picture/gesture password" and "picture password" are interchangeably used herein to refer to the process of providing a password formed from gestures made relative to a picture. For example, given a picture of 5 people, the gestures can be tapping the head of each person in a particular order. Of course, the preceding gestures are merely illustrative and, thus, other gestures can also be used relative to the picture in order to provide a picture password.

In an embodiment, the present principles determine patterns that are easy to hack during the picture password process. The program creates and uses dynamic rules according to certain parameters and can inform a user that their picture/gesture password is weak or too easy to hack and is therefore rejected. These and other types of alerts and/or actions be performed responsive to determining the strength of a given picture password.

Figure 1:
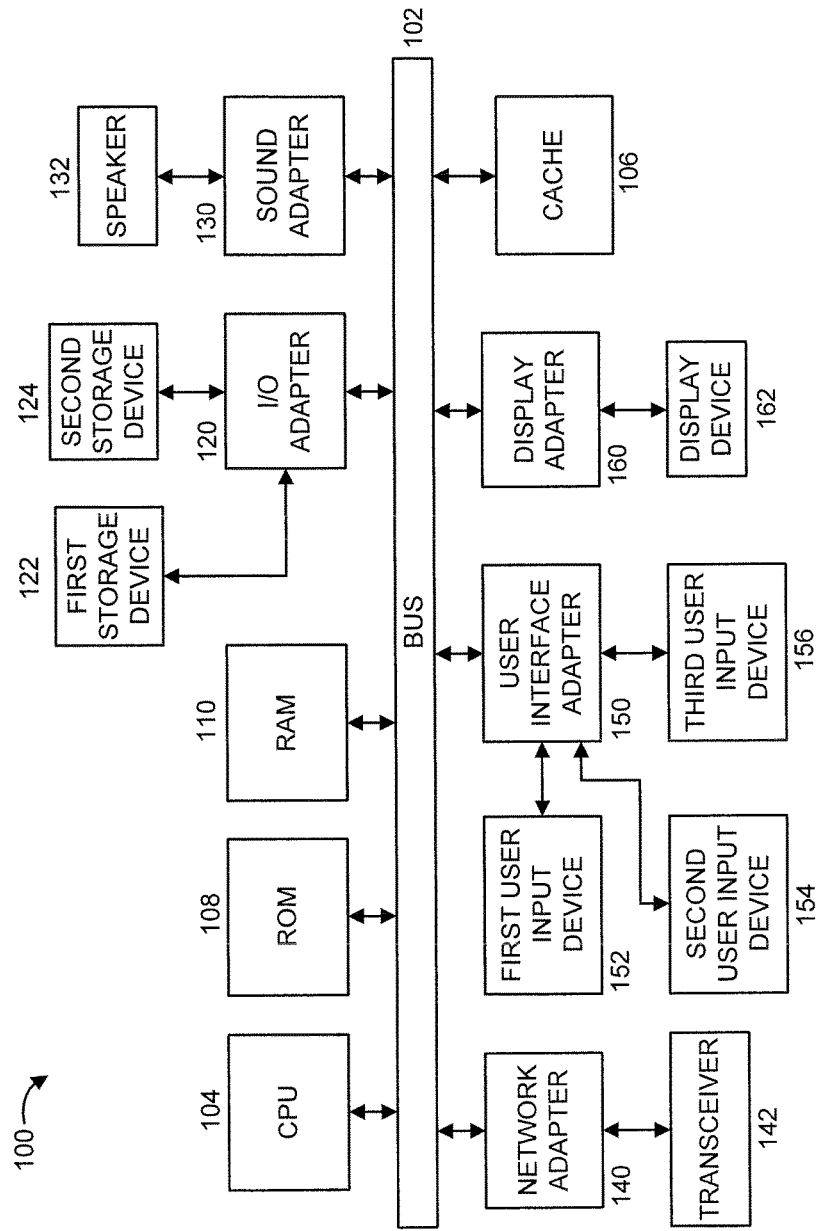
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
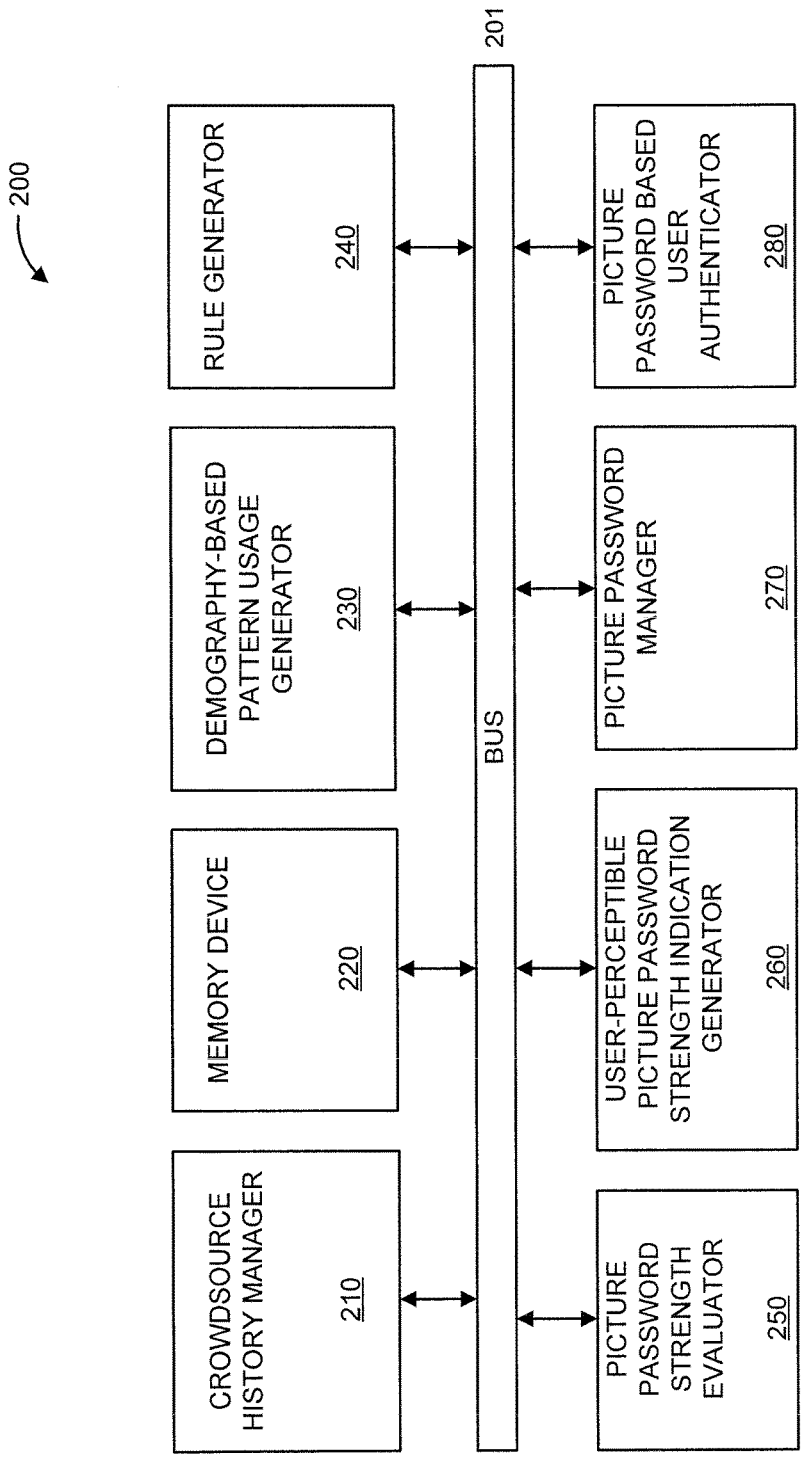
FIG. 2 shows an exemplary system 200 for picture/gesture password protection, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
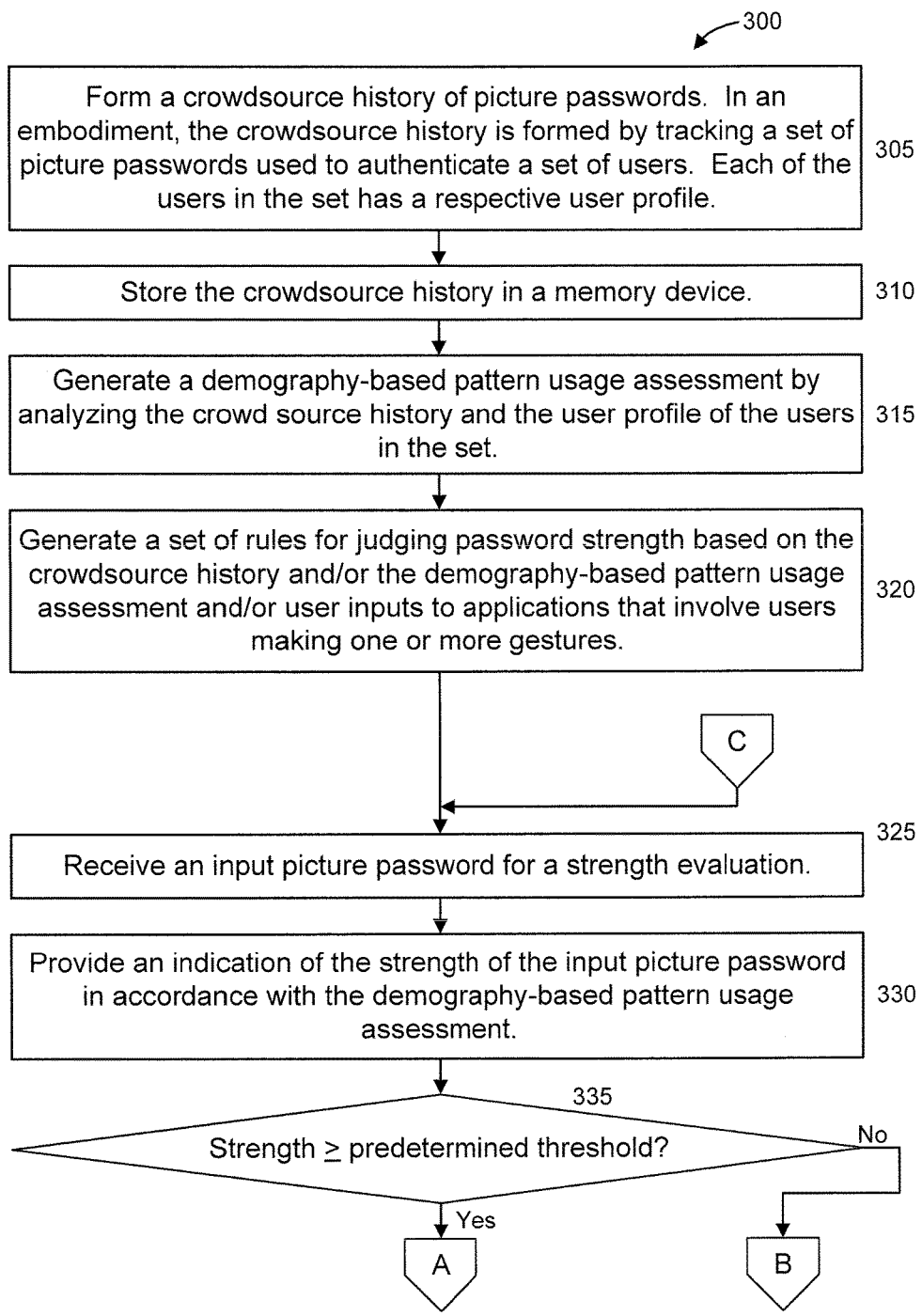
FIGS. 3-4 show an exemplary method 300 for picture/gesture password protection, in accordance with an embodiment of the present principles.
Figure 4:
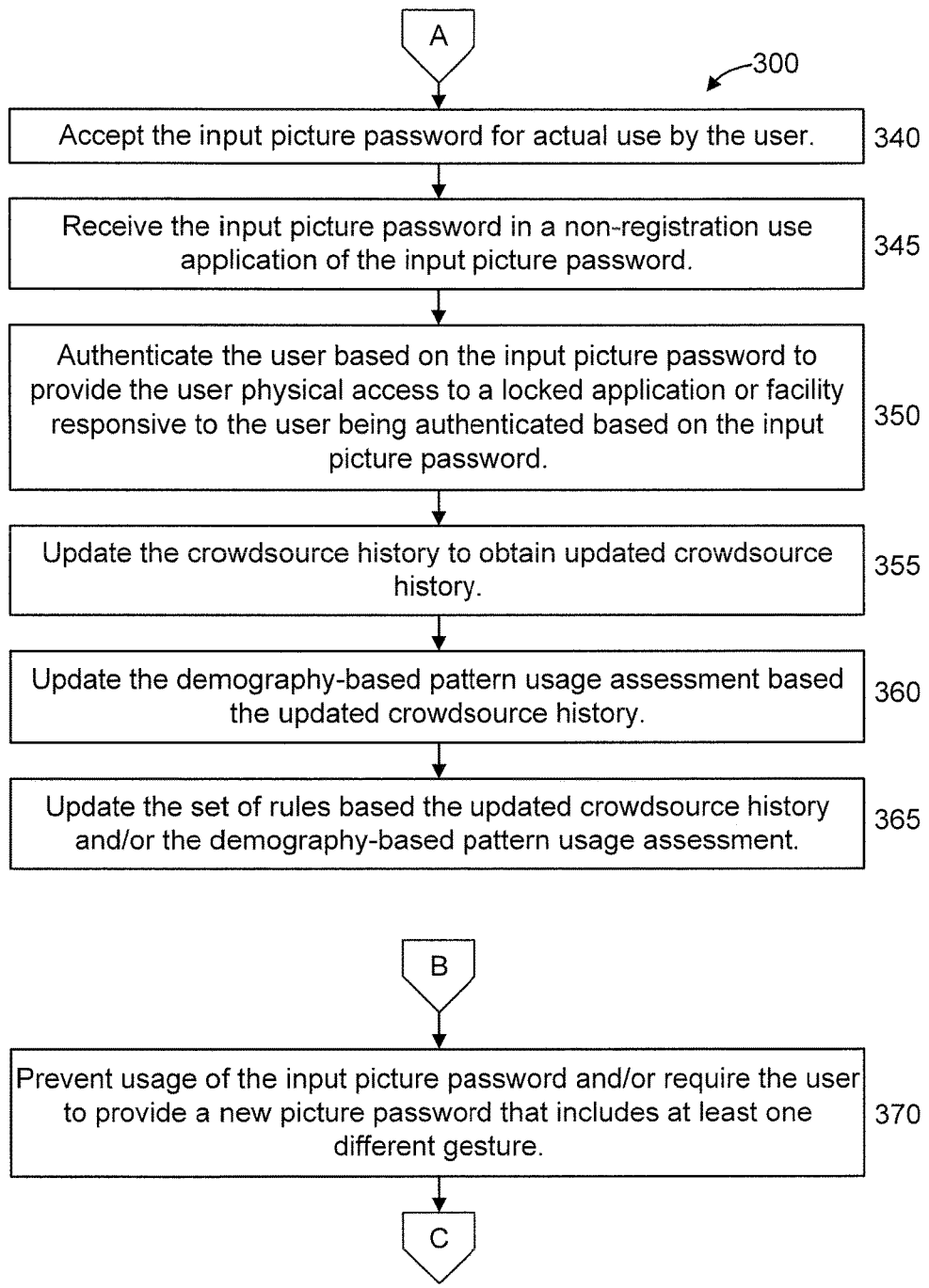

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary system 200 for picture/gesture password protection, in accordance with an embodiment of the present principles.

The system 200 includes a crowdsource history manager 210, a memory device 220, a demography-based pattern usage generator 230, a rule generator 240, a picture password strength evaluator 250, a user-perceptible picture password strength indication generator 260, a picture password manager 270, and a picture password based user authenticator 280.

The crowdsource history manager 210 forms a crowdsource history by tracking a set of picture passwords used to authenticate a set of users. Each of the users in the set has a respective user profile.

The memory device 220 stores the crowdsource history and other data generated and/or collected by method 300.

The demography-based pattern usage assessment generator 230 generates a demography-based pattern usage assessment by analyzing the crowd source history and the user profile of the users in the set.

The rule generator 240 can generate a set of rules for judging password strength based on the crowdsource history and/or the demography-based pattern usage assessment and/or user inputs to applications that involve users making one or more gestures.

The picture password strength evaluator 250 evaluates (identifies) the strength of an input picture password. In an embodiment, the strength of an input picture password is evaluated based on the rules and/or elements from which the rules can be formed, including the crowdsource history and/or the demography-based pattern usage assessment and/or the user profiles. In an embodiment, the picture password strength evaluator 250 can evaluate the input picture password using a two-dimensional grid and/or a three-dimensional grid.

The user-perceptible picture password strength indication generator 260 provides a user-perceptible indication of the strength (e.g., weak, medium, and strong) of the input picture password in accordance with the demography-based pattern usage assessment. The user-perceptible picture password strength indication generator 260 can initiate and/or otherwise cause such an indication to be provided to a user. For example, the user-perceptible picture password strength indication generator 260 can cause the indication to be provided on another device (e.g., a mobile or other device or the user). The indication can include a visually or audibly perceptible measure of the strength. Visually perceptible measures that can be used include text characters, symbols, colors, and/or so forth. Audibly perceptible measures that can be used include audibly reproducing the text characters, symbols, colors, and/or so forth.

The picture password manager 270 can accept the input picture password for actual use by the user, responsive to the strength of the picture password being equal to or above a predetermined threshold. The picture password manager 270 can prevent usage of the input picture password and/or require the user to provide a new picture password that includes at least one different gesture, responsive to the strength of the picture password being indicated as below the predetermined threshold.

The picture password based user authenticator 280 receives the input picture password in a non-registration use application of the input picture password, and authenticates the user based on the input picture password to provide the user physical access to a locked application or facility responsive to the user being authenticated based on the input picture password.

In an embodiment, it is to be appreciated that one or more elements of system 200 may be implemented in the cloud. For example, in an embodiment, the strength determination process is determined in the cloud and the strength indication is transmitted from the cloud to a user device.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIGS. 3-4 show an exemplary method 300 for picture/gesture password protection, in accordance with an embodiment of the present principles. Method 300 identifies the strength of an input picture password formed by performing a sequence of gestures relative to a picture.

At step 305, form a crowdsource history of picture passwords. In an embodiment, the crowdsource history is formed by tracking a set of picture passwords used to authenticate a set of users. Each of the users in the set has a respective user profile. In an embodiment, step 305 begins a creation phase of method 300.

At step 310, store the crowdsource history in a memory device. In an embodiment, the crowdsource history is received remotely (e.g., from a remote cloud server), and storing per step 310 can be in a memory buffer or other storage device for processing in accordance with the present principles.

At step 315, generate a demography-based pattern usage assessment by analyzing the crowd source history and the user profile of the users in the set. In an embodiment, the demography-based pattern usage assessment is determined from a demography that includes at least one of a language style (e.g., right to left versus left to right, and so forth), an age group, a country, an experience level, a gender, and a culture. Of course, other demographics can also be used in accordance with the teachings of the present principles while maintaining the spirit of the present principles.

In an embodiment, the demography-based pattern usage assessment is determined from a pattern usage that includes an image main point of interest reference, a contour, a common pattern, a predictable pattern, a circular pattern, and a direction. Of course, other pattern usages can also be used in accordance with the teachings of the present principles while maintaining the spirit of the present principles.

At step 320, generate a set of rules for judging password strength based on the crowdsource history and/or the demography-based pattern usage assessment. In an embodiment, the set of rules are generated further based on user inputs to applications that involve users making one or more gestures.

At step 325, receive an input picture password for a strength evaluation.

At step 330, provide an indication of the strength of the input picture password in accordance with the demography-based pattern usage assessment. In an embodiment, the strength of the input picture password is indicated using a measure selected from weak, medium, and strong. Of course, other indicators (for example, including, but not limited to, other words, colors, symbols, and so forth) can also be used in accordance with the teachings of the present principles while maintaining the spirit of the present principles.

In an embodiment, step 330 involves evaluating the input picture password using a two-dimensional grid and/or a three-dimensional grid. In an embodiment, step 350 involves evaluating the input picture with respect to a set of commonly used patterns, wherein a pattern status of commonly used is determined based on the demography-based pattern usage assessment. In an embodiment, step 330 involves evaluating the input picture with respect to a set of too easily predicted patterns, wherein a pattern status of too easily predicted is determined based on the demography-based pattern usage assessment.

At step 335, determine whether the strength of the input picture password is equal to or above a predetermined threshold. If so, then the method proceeds to step 340. Otherwise, the method proceeds to step 370.

At step 340, accept the input picture password for actual use by the user (responsive to the strength of the picture password being indicated as being equal to or above a predetermined threshold). In an embodiment, step 340 concludes a creation phase of method 300.

At step 345, receive the input picture password in a non-registration use application of the input picture password.

At step 350, authenticate the user based on the input picture password to provide the user physical access to a locked application or facility responsive to the user being authenticated based on the input picture password.

It is to be appreciated that steps 345 and 350 can be performed at any time after, e.g., step 340, as they pertain to post-creation steps (that is, after the input picture password has been created and authorized for actual use by a user).

At step 355, update the crowdsource history to obtain updated crowdsource history.

At step 360, update the demography-based pattern usage assessment based the updated crowdsource history.

At step 365, update the set of rules based the updated crowdsource history and/or the demography-based pattern usage assessment.

It is to be appreciated that steps 355, 360, and 365 can be performed at any time after, e.g., step 340, as they pertain to post-creation steps (that is, after the input picture password has been created and authorized for actual use by a user).

At step 370, prevent usage of the input picture password and/or require the user to provide a new picture password that includes at least one different gesture (responsive to the strength of the picture password being indicated as below the predetermined threshold). In the embodiment, step 355 involves returning to step 325 to input the new picture password.

It is to be appreciated that the present principles work with picture password technology (and any other gesture passwords) to help a user identify the strength (e.g., strong or weak) of a picture password. In an embodiment, during the creation of a picture password, the present principles use grid technology to match the user's pattern to a pre-set group of gestures and rules that are considered weak, medium or strong (red, yellow or green). The process can be incorporated with picture password technology to give feedback to the user while creating their passwords. The use of grid technology can involve, but is not limited to, using a two-dimensional and/or a three-dimensional grid to evaluate corresponding gestures for a picture password against a set of pictures depicting various gestures (e.g., common gesture patterns, easily predicted gesture patterns, rare gesture patterns, difficult to predict gesture patterns, and so forth), using feature identification (e.g., points of interest), distance measures and so forth. Of course, other techniques can also be used in accordance with the teachings of the present principles, while maintaining the spirit of the present principles.

In an embodiment, the present principles identify weaknesses with the picture password technology by using a pre-set group of rules and gestures that could be determined by the user's profile and background. The user's profile and background can include and/or otherwise involve, but is not limited to, any of country, language, cultural profile, gender, and so forth. One reason for using the user's profile or demographics is because the rules could be developed from common gesture patterns on these groups. For example, a gesture line made from left to right might be weak for U.S. people (since people in the U.S. typically write from left to right) but that may not be always the case for people in Japan or Israel (since they do not always write from left to right). While left to right lines may be weak in this country, they may not be weak in Japan. If we do crowd-sourcing, we could also include demographics and profiles where we may find common gesture patterns across specific groups. For example, females may be more prone to certain gesture aspects on family pictures versus males (or young/teenagers versus seasoned people, and so forth). In an embodiment, the set of rules are dynamic and can learn from people and change over time accordingly.

In an embodiment, the present principles can also learn from the compilation of old picture passwords used by comparing common gesture patterns and perhaps even using them in relation to the type of figure used within the picture. The present principles can also dynamically learn from crowd-sourced information and touch-screen apps. As touch screen applications (i.e., smartphone applications) keep on growing and changing, the present principles can learn from the most used (most common) gestures in order to make suggestions to the system. One example is a smartphone unlock touch screen, which most typically uses a "left-to-right" swipe or line in order to unlock the screen.

In an embodiment, a user is authenticated for access to an item or facility (which can involve unlocking a secured device or door to permit the user access) by matching the gestures to the library drawing set associated with a specific user. A matrix of drawing sets having commonly used patterns is employed to provide system feedback to a user about the weakness of their gesture pattern (e.g., using indicators such as, but not limited to, words that include weak, normal, and strong, or colors that include red, yellow, green, and so forth).

In an embodiment, a special algorithm involving two or three dimensions can be used to evaluate the strength of picture/gesture passwords, whereby starting and ending points of a gesture are recorded to see the actual pattern within the reference of a particular picture or screen.

A description will now be given of an exemplary set of rules for picture/gesture password protection, in accordance with an embodiment of the present principles.

In the embodiment, the present principles employ gestures including, but not limited to, circles, taps and/or lines. Of course, other gestures can also be used in accordance with the teachings of the present principles, while maintaining the spirit of the present principles.

In the embodiment, the set of rules can include, but are not limited to, any of the following: (1) gestures that follow the contours of the image are weak gestures (too predictable); (2) dots over eyes are weak gestures (since, according to some studies, these gestures are some of the most used gestures); (3) left to right lines could be a weak gesture (people tend to draw lines in the same manner in which they write); (4) circles made from top-right-bottom-left-top are weak gestures; and (5) circles over people's heads are weak gestures (too predictable). It is to be appreciated that the preceding types of gestures are merely exemplary and, thus, the present principles can be readily used with other types of gestures, while maintaining the spirit of the present principles.

Figure 5:
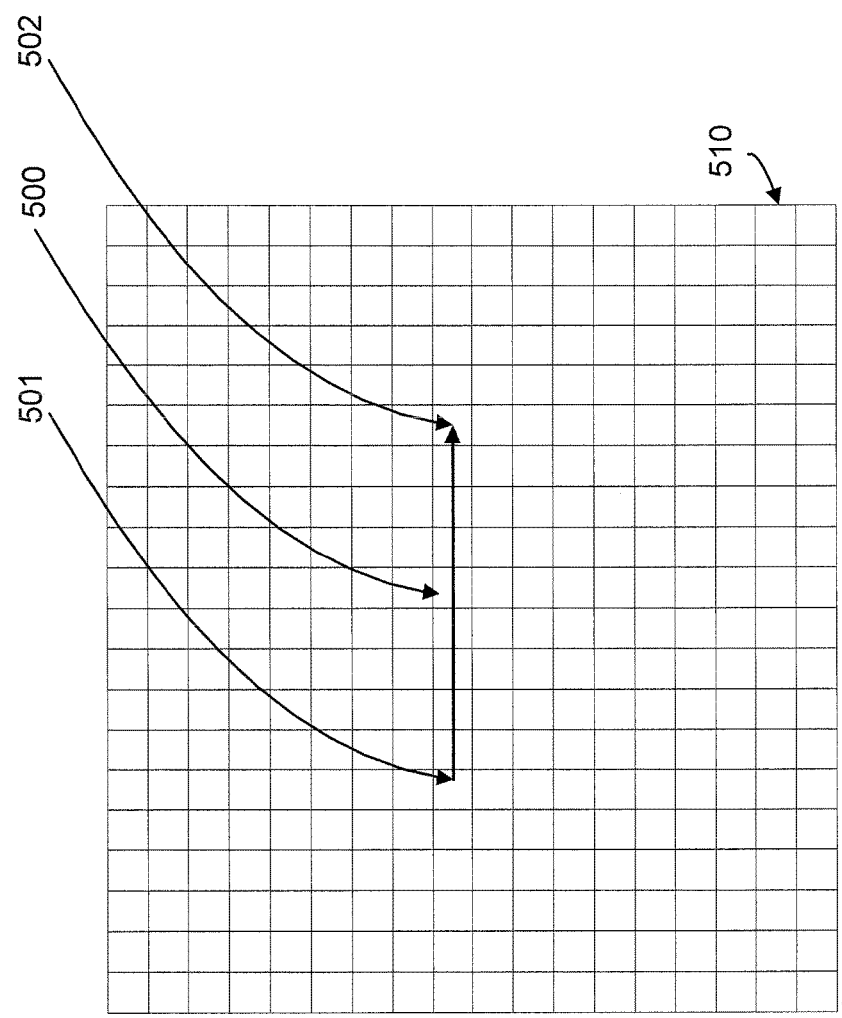
FIG. 5 shows an exemplary gesture 500 to which the present principles can be applied, in accordance with an embodiment of the present principles.
Figure 6:
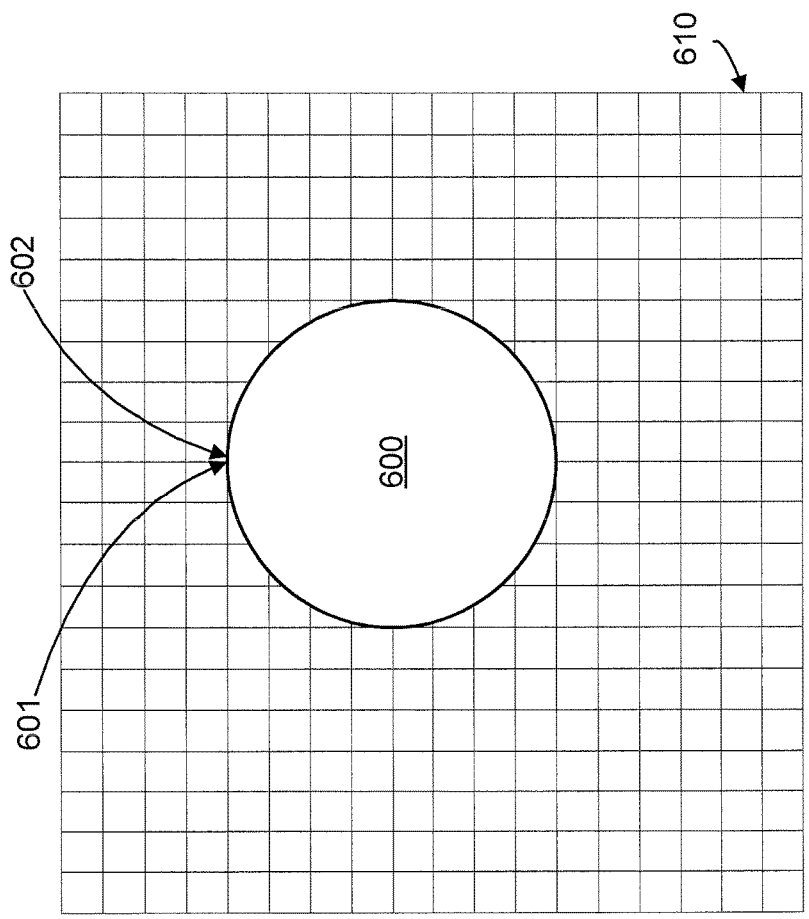
FIG. 6 shows another exemplary gesture 600 to which the present principles can be applied, in accordance with an embodiment of the present principles.

FIG. 5 shows an exemplary gesture 500 to which the present principles can be applied, in accordance with an embodiment of the present principles. FIG. 6 shows another exemplary gesture 600 to which the present principles can be applied, in accordance with an embodiment of the present principles.

Gestures 500 and 600 are compared against the user's gestures, for example, using an x/y axis grid (510 in FIG. 5, 610 in FIG. 6) and comparing gestures 500 and 600 to a set of gestures in a library of drawings. Gesture 500 starts at starting point 501 and ends at ending point 502. Gesture 600 starts at starting point 601 and ends at ending point 602.

A description will now be given of an extension to the present principles, in accordance with an embodiment of the present principles.

In the embodiment, the present principles are used with respect to 3D gesture passwords or 3D gesture interactions and any other gesture password/technology. In the case of 3D, we will use a three-dimensional grid (e.g., x, y, and z) to apply the same concept and identify which gestures may be weaker than others for the purpose of security.

Image processing can be used to verify that the resolution and full display of the picture does not get affected by the variety of devices that can be used by a user. In this way, the present principles can notify the user that the picture is not being properly displayed for the use of picture password. In addition, the user can be notified if the photo used does not include enough contrast (points of interests) to create a good variety of gesture points.

These and various other extensions that can be applied to the present principles are readily contemplated by one of ordinary skill in the art given the teachings of the present principles provided herein, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
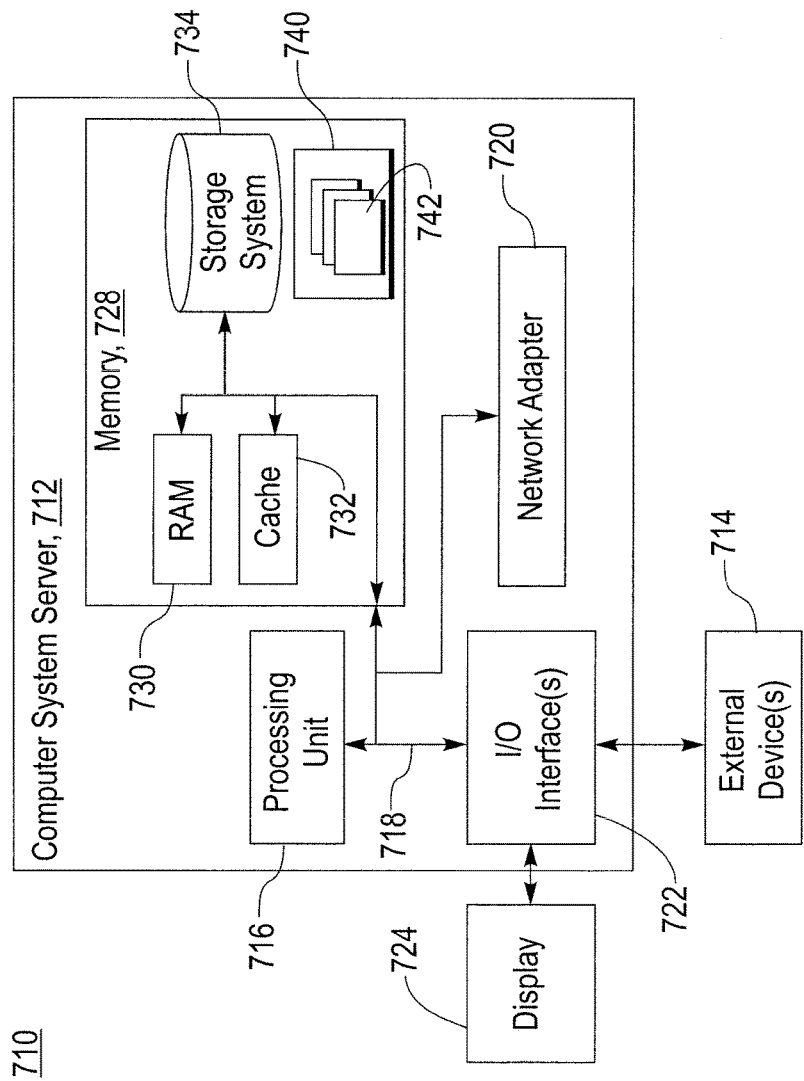
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
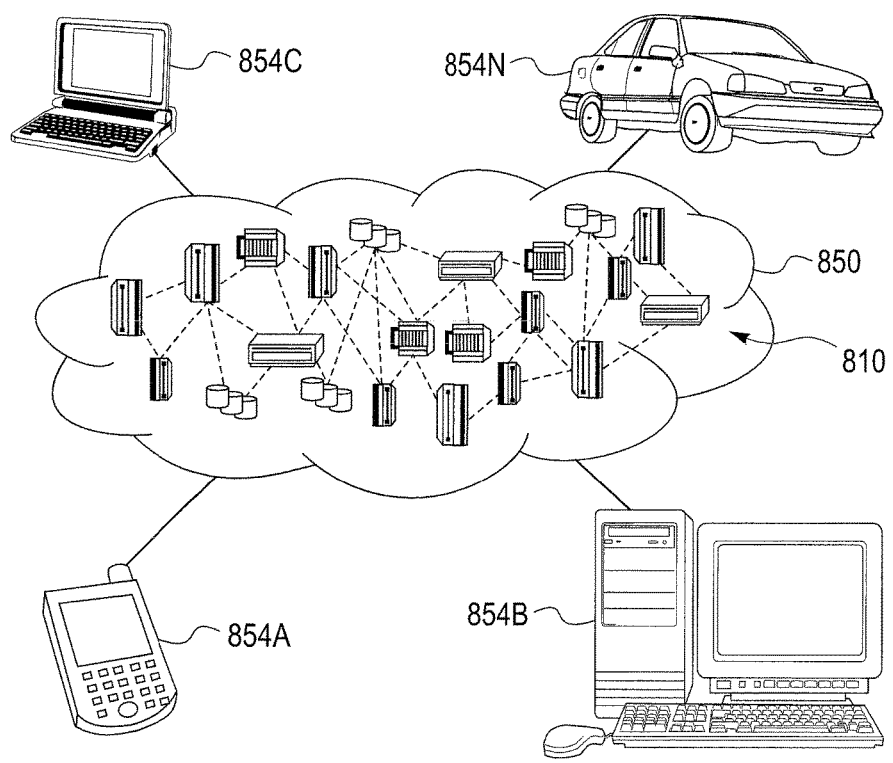
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
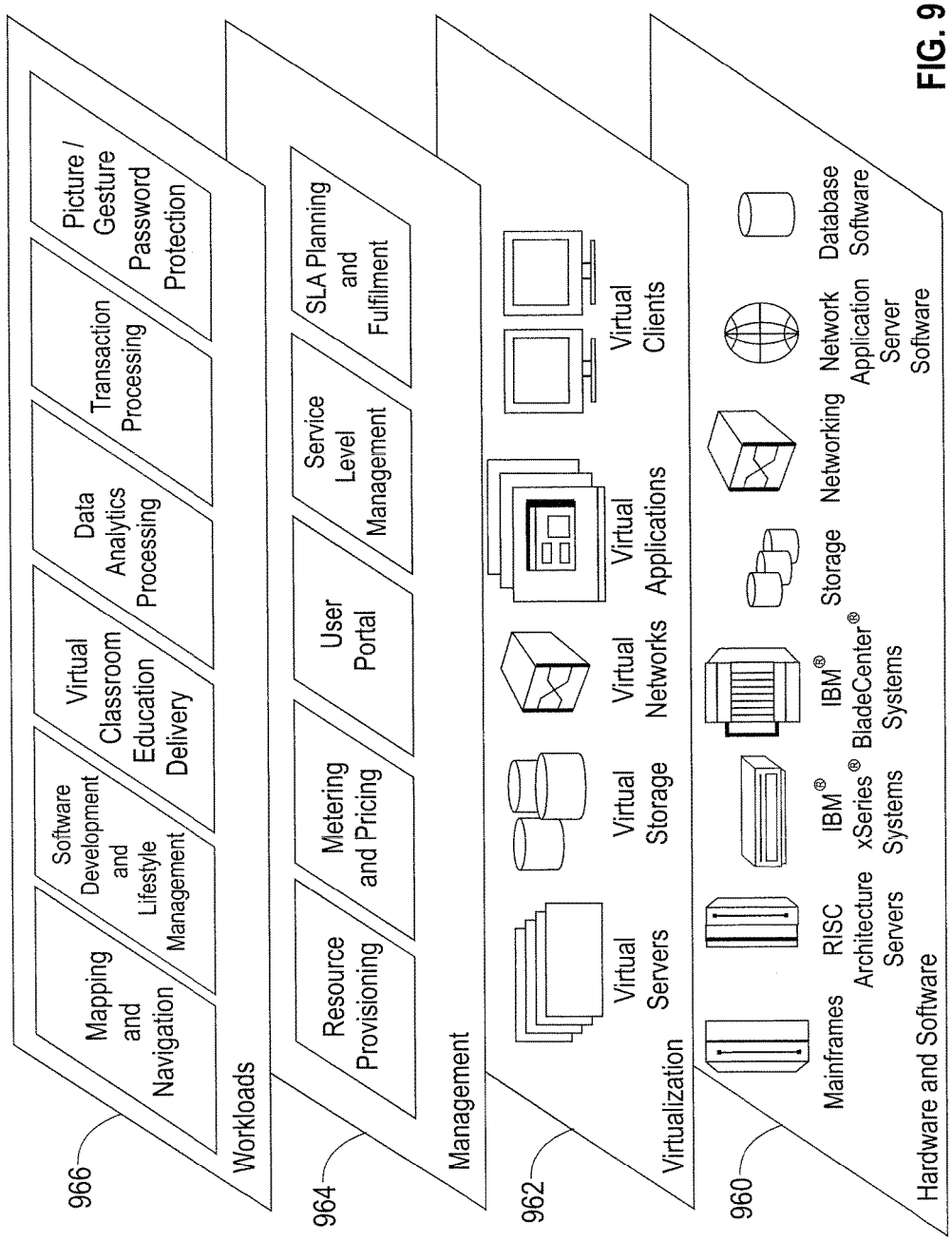
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and picture/gesture password protection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for identifying a strength of an input picture password formed from a selected picture and performing a sequence of gestures relative to the picture, the computer program product comprising a non-transitory computer readable storage medium having program instructions embodied therewith, the program instructions executable by a computer to cause the computer to perform a method comprising:

storing, in a memory device, a crowd source history of picture passwords formed by tracking a plurality of picture passwords used to authenticate a plurality of users, each of the plurality of users having a respective user profile including at least one non-language demographic and each of the plurality of picture passwords including a picture selected by a user of the plurality of users and a sequence of gestures performed relative to the picture by the user;

generating, by a processor-based demography-based pattern usage assessment generator, a demography-based pattern usage assessment corresponding to the at least one non-language demographic by analyzing the crowd source history and the user profiles of the plurality of users to develop rules from the crowd source history according to common gestures for the at least one non-language demographic, wherein the rules are indicative of a strength of each gesture in the sequence of gestures according to how the sequence of gestures is performed relative to the picture; and providing, by a user-perceptible indication device, an indication of the strength of the input picture password in accordance with the demography-based pattern usage assessment corresponding to the at least one non-language demographic.

2. A system for identifying a strength of an input picture password formed from a selected picture and performing a sequence of gestures relative to the picture, the system comprising:

a memory device for storing a crowd source history of picture passwords formed by tracking a plurality of picture passwords used to authenticate a plurality of users, each of the plurality of users having a respective user profile including at least one non-language demographic and each of the plurality of picture passwords including a picture selected by a user of the plurality of users and a sequence of gestures performed relative to the picture by the user;

a processor-based demography-based pattern usage assessment generator for generating a demography-based pattern usage assessment corresponding to the at least one non-language demographic by analyzing the crowd source history and the user profiles of the plurality of users to develop rules from the crowd source history according to common gestures for the at least one non-language demographic, wherein the rules are indicative of a strength of each gesture in the sequence of gestures according to how the sequence of gestures is performed relative to the picture; and a user-perceptible indication device for providing an indication of the strength of the input picture password in accordance with the demography-based pattern usage assessment corresponding to the at least one non-language demographic.

3. The system of claim 2, wherein the demography-based pattern usage assessment is further determined from a demographic that includes a language style.

4. The system of claim 3, wherein e language style includes a direction of reading and writing.

5. The system of claim 2, wherein the demography-based pattern usage assessment is determined from a pattern usage that includes an image main point of interest reference.

6. The system of claim 2, further comprising a rule generator for generating a set of rules for judging password strength based on at least one of the crowd source history and the demography-based pattern usage assessment.

7. The system of claim 6, wherein the set of rules are generated further based on user inputs to applications that involve users making one or more gestures.

8. The system of claim 6, wherein the set of rules are dynamically updated over time.

9. The system of claim 2, wherein the demography-based pattern usage assessment is determined from a demographic that includes an age group.

10. The system of claim 2, wherein the demography-based pattern usage assessment corresponding to the at least one non-language demographic is determined from a country specified in the user profiles.

11. The system of claim 2, wherein the demography-based pattern usage assessment corresponding to the at least one non-language demographic is determined from an experience level specified in the user profiles.

12. The system of claim 2, wherein the demography-based pattern usage assessment corresponding to the at least one non-language demographic is determined from a gender specified in the user profiles.

13. The system of claim 2, wherein the demography-based pattern usage assessment corresponding to the at least one non-language demographic is determined from a culture specified in the user profiles.

14. The system of claim 2, wherein the demography-based pattern usage assessment corresponding to the at least one non-language demographic is determined from a pattern usage that includes a contour.

15. The system of claim 2, wherein the demography-based pattern usage assessment corresponding to the at least one non-language demographic is determined from a pattern usage that includes a predictable pattern.

16. The system of claim 2, wherein the demography-based pattern usage assessment corresponding to the at least one non-language demographic is determined from a pattern usage that includes a circular pattern.

17. The system of claim 2, wherein the processor-based demography-based pattern usage assessment generator is further configured to analyze compilations of old input picture passwords.

18. The system of claim 2, wherein the at least one non-language demographic comprises a gender of the user, and wherein the demography-based pattern usage assess n corresponding to the at least one non-language demographic evaluates the gender of the user with respect to a family picture.

19. The system of claim 2, wherein the demography-based pattern usage assessment corresponding to the at least one non-language demographic evaluates the at least one non-language demographic with respect to a type of figure used within a picture.

* * * * *